(No Model.)  2 Sheets—Sheet 1.

J. G. CORYELL.
HEATER.

No. 463,827.  Patented Nov. 24, 1891.

WITNESSES:
John A. Rennie
Chas. A. Walsh

INVENTOR:
Joseph George Coryell,
By Henry Connett
Attorney.

THE NORRIS PETERS CO., PHOTO-LITHO., WASHINGTON, D. C.

(No Model.) 2 Sheets—Sheet 2.
J. G. CORYELL.
HEATER.
No. 463,827. Patented Nov. 24, 1891.
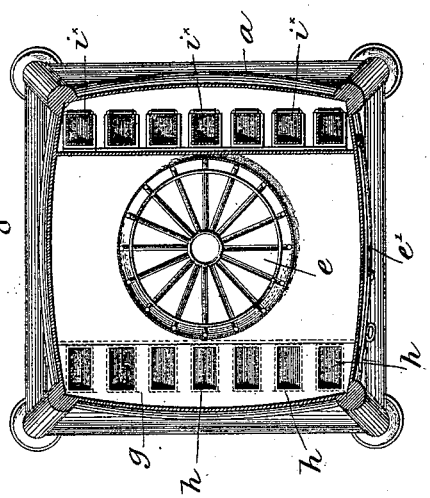
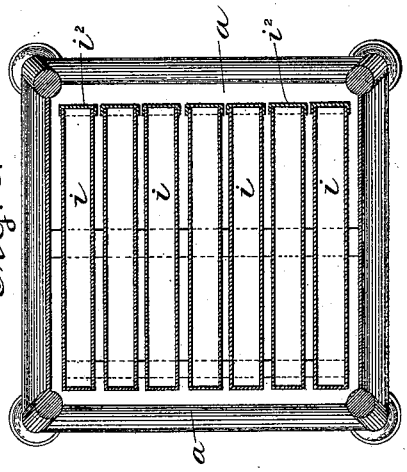
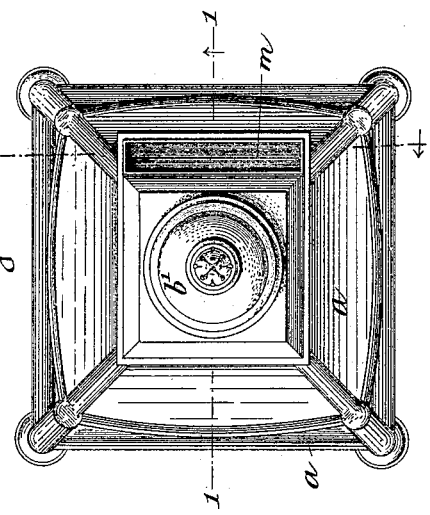
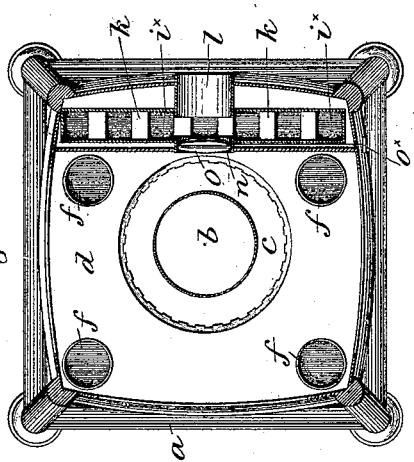
WITNESSES:
John A. Rennie
Chas. A. Walsh
INVENTOR:
Joseph George Coryell
By Henry Connett
Attorney.

UNITED STATES PATENT OFFICE.

JOSEPH GEORGE CORYELL, OF FISHKILL-ON-THE-HUDSON, NEW YORK.

HEATER.

SPECIFICATION forming part of Letters Patent No. 463,827, dated November 24, 1891.

Application filed May 28, 1891. Serial No. 394,409. (No model.)

*To all whom it may concern:*

Be it known that I, JOSEPH GEORGE CORYELL, a citizen of the United States, and a resident of Fishkill-on-the-Hudson, in the county of Dutchess and State of New York, have invented certain new and useful Improvements in Heaters, of which the following is a specification.

My invention relates to the class of stoves or heaters wherein the products of combustion may be caused to pass through circuitous flues on their way to the chimney, said flues passing through air spaces or passages, whereby the air is heated in its flow through said passages to the air-outlet.

The invention will be fully described hereinafter, and its novel features carefully defined in the claims.

Figure 2:
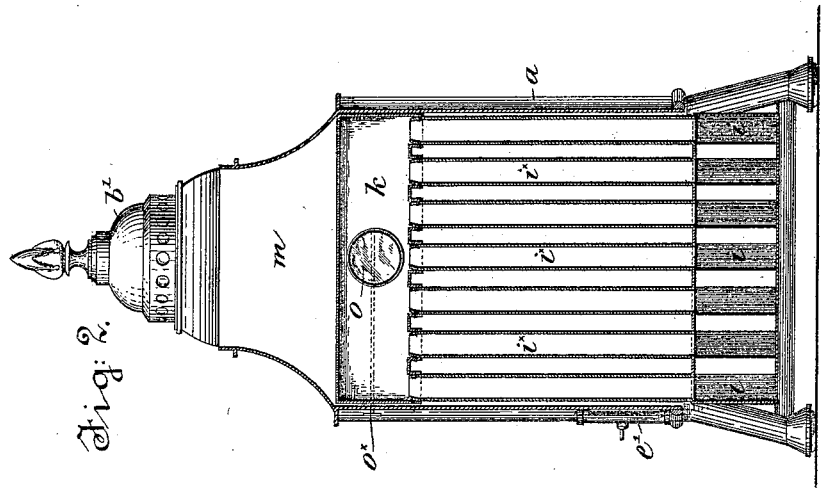
Figure 1:
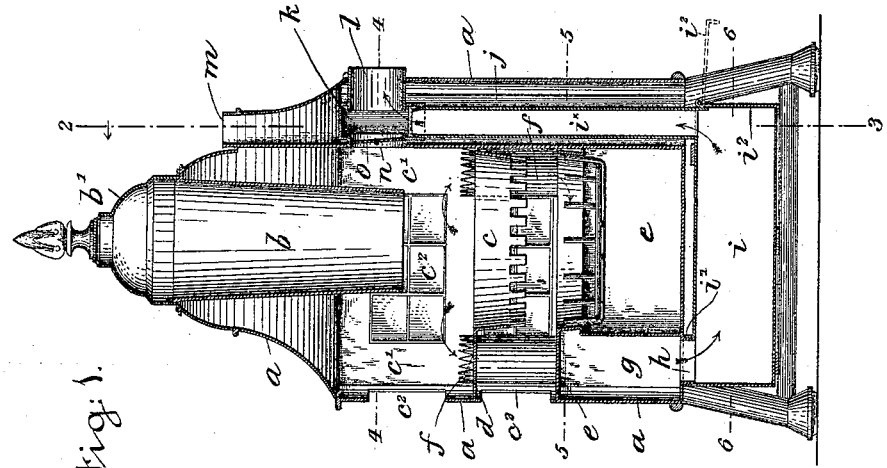

In the accompanying drawings, which serve to illustrate my invention, Figure 1 is a sectional elevation of a heater embodying my improvements, the plane of the section being indicated by the line 1 1 in Fig. 3. Fig. 2 is also a sectional elevation, the plane of the section being indicated by the lines 2 2 in Figs. 1 and 3. Fig. 3 is a plan of the heater. Figs. 4, 5, and 6 are horizontal sections of the heater, taken, respectively, in the planes indicated by the lines 4 4, 5 5, and 6 6 in Fig. 1.

$a$ represents the outer shell or casing of the heater, and $b$ is the fuel-magazine, provided with a removable cover $b'$.

$c$ is the fire-pot, and $c'$ the combustion-chamber above the fire-pot and about the magazine.

The casing may have mica windows $c^2$ in its sides.

Below the grate is the ash-box $e$, the door $e'$ of which is seen in Fig. 5.

Across the interior of the heater are two partitions $d$ and $e$, the former or upper one being at the level of the top of the fire-pot, as seen in Figs. 1 and 4, and the latter or lower one being down near the grate. Vertical flues $f$, preferably four in number, lead the gases from the combustion-chamber down through these partitions into a chamber $g$ at the side of the ash-box $e$. From this chamber $g$ the gases pass down through openings $h$ in the bottom of the chamber into a set of L-shaped flues $i$ $i^x$, of which $i$ designates the horizontal portion which occupies the partly-inclosed space under the ash-box, and $i^x$ the upright portion which extends up through an air-passage $j$ and opens into an upper chamber $k$. The outlet $l$ from this chamber receives the smoke flue or pipe. (Not shown.)

The series of L-shaped flues are connected together to form a set, and there are seven of these flues represented in the drawings. They are made to fit into sockets where they enter the upper chamber $k$, and the openings $h$ are furnished each with a pendent nipple which enters a socket in the horizontal member $i$ of the flue, as seen at $i'$ in Fig. 1. The set of L-shaped flues may be removed from the heater for cleaning the latter or for convenience in setting it up. Each one of these flues has a door $i^2$, arranged convenient for access. This door may be opened for furnishing access to the flue for cleaning it. When opened, the door, which is hinged at its upper end, presents the appearance indicated in dotted lines in Fig. 1. The air has free access to the partly-inclosed space under the heater, where the portions $i$ of the flues are situated, and in its upward flow it passes about and between said flues and thence up through the broad air-passage $j$, where the portions $i^x$ of the flues are situated, finally emerging at the outlet $m$, from whence it may be led to any point desired by the usual air flue or flues. (Not shown.) The air-passage $j$ is inclosed, and the chamber $k$ is situated within it, and the air flowing upward through this passage must of necessity come into close contact with the upright flues $i^x$ and the walls of said chamber $k$.

It is convenient at times to give the heater a direct draft, and to provide for this I form a passage $n$ in the back wall of the combustion-chamber opposite to the outlet $l$ and connecting, like said outlet, with the chamber $k$, and in this passage I place a damper $o$, furnished with an operating-stem $o'$, whereby said passage may be wholly or partially opened in order to provide a direct draft between the fire-box and the outlet $l$.

The heater may have any suitable exterior contour or form. The form illustrated in the drawings need not be strictly adhered to. The construction shown and described may also be varied to some extent without materially departing from my invention. For example there may be more or less than four of the fixed flues $f$. It is only necessary that they should suffice to carry off all the products of combustion.

The air admitted to the inclosed space below the ash-box may come from the room in which the heater is placed or be led to it from outside of the house in the manner that air is led to the ordinary heating apparatus. When the air is taken from the room, this space at the base of the heater will be inclosed on three sides by preference; but when it is taken from the outside of the house this space will be wholly inclosed except at the point where it will be tapped by the air-conduit.

I have described the flues $i\ i^\times$ as L-shaped, and they will usually have this form or some modification thereof, as a J shape, for example. They will, indeed, be adapted to the form of the furnace. The object in constructing these flues in a series is to allow the air to circulate between and around them; but I do not wish to limit myself to any number of these flues.

Having thus described my invention, I claim—

1. In a heater, the combination, with the casing or outer shell and the combustion-chamber, the fire-pot, the ash-box, the chamber $g$, separated from the combustion-chamber by partitions, and the air-passage $j$ at the opposite side of the ash-box from the chamber $g$, all within said casing, of the gas-flues $f$, leading from the combustion-chamber down to the chamber $g$, the chamber $k$, connected with the smoke and gas outlet, and the L-shaped flues $i\ i^\times$, connected at one extremity with the chamber $g$, extending under the ash-box and connecting at the other or upper extremity with the chamber $k$, the portions $i$ of said flues being situated in the base of the heater below the ash-box, and the portions $i^\times$ thereof being situated in the upright air-passage $j$, as set forth.

2. In a heater having a chamber $g$ connected with the combustion-chamber by means of flues and the chamber $k$ connected with the smoke and gas outlet, the set of L-shaped flues $i\ i^\times$, joined together and connected detachably at one extremity with the chamber $g$ and at the other extremity with the chamber $k$, said L-shaped flues having their horizontal portions situated in the base of the heater, substantially as set forth.

3. In a heater having a chamber $g$ arranged below the combustion-chamber and connected therewith by flues and a chamber $k$ connected with the smoke and gas outlet, the set of L-shaped flues connecting said chambers $g$ and $k$, said flues having upright portions $i^\times$ and horizontal portions $i$, the latter being provided with doors $i^2$ at their ends for convenience in cleaning them, as set forth.

In witness whereof I have hereunto signed my name in the presence of two subscribing witnesses.

JOSEPH GEORGE CORYELL.

Witnesses:
JOSEPH D. CITÉ,
WILLIAM M. BOWHER.